(12) United States Patent
Levy

(10) Patent No.: US 6,938,104 B2
(45) Date of Patent: Aug. 30, 2005

(54) REMOVABLE HARD DRIVE ASSEMBLY, COMPUTER WITH A REMOVABLE HARD DISK DRIVE, METHOD OF INITIALIZING AND OPERATING A REMOVABLE HARD DRIVE

(75) Inventor: Itzik Levy, Hollywood, FL (US)

(73) Assignee: Arco Computer Products, Inc., Hollywood, FL (US)

( * ) Notice: Subject to any disclaimer, the term of this patent is extended or adjusted under 35 U.S.C. 154(b) by 151 days.

(21) Appl. No.: 10/639,399

(22) Filed: Aug. 12, 2003

(65) Prior Publication Data

US 2005/0038931 A1 Feb. 17, 2005

(51) Int. Cl.[7] .............................................. G06F 13/00
(52) U.S. Cl. .............................. 710/8; 710/38; 710/62; 710/74; 713/1; 713/100; 361/685
(58) Field of Search ......................... 710/8–14, 36–38, 710/62–64, 74; 713/1–2, 100; 361/685; 717/128

(56) References Cited

U.S. PATENT DOCUMENTS

| 4,941,841 | A | * | 7/1990 | Darden et al. ............... 361/685 |
| 5,065,262 | A | * | 11/1991 | Blackborow et al. ......... 360/75 |
| 5,214,550 | A | * | 5/1993 | Chan ........................ 360/97.01 |
| 5,422,775 | A | * | 6/1995 | Martin ........................ 360/133 |
| 5,692,190 | A | * | 11/1997 | Williams ....................... 713/2 |
| 5,701,477 | A | * | 12/1997 | Chejlava, Jr. ................. 713/2 |
| 5,809,300 | A | * | 9/1998 | Utsumi et al. ................ 713/1 |
| 5,947,572 | A | * | 9/1999 | Chang ..................... 312/332.1 |
| 6,484,308 | B1 | * | 11/2002 | Pearce et al. ............... 717/128 |
| 2002/0144044 | A1 | * | 10/2002 | Moon et al. ................ 710/302 |
| 2003/0163610 | A1 | * | 8/2003 | Stevens ........................ 710/8 |

* cited by examiner

*Primary Examiner*—Christopher B. Shin
(74) *Attorney, Agent, or Firm*—Laurence A. Greenberg; Werner H. Stemer; Ralph E. Locher

(57) ABSTRACT

A hard disk drive is rendered removable by modifying its ID buffer to indicate to the host computer that the hard drive is a removable media device. A drive assembly is mounted in a drive bay of the host computer and permanently connected to the assembly. A hard drive is mounted in a removable cartridge that is dimensioned for insertion into the drive assembly. The drive assembly reads the hard drive ID buffer, modifies the buffer and stores the same. Upon request from the host computer, the modified buffer is presented.

15 Claims, 5 Drawing Sheets

REMOVABLE HARD DRIVE ASSEMBLY, COMPUTER WITH A REMOVABLE HARD DISK DRIVE, METHOD OF INITIALIZING AND OPERATING A REMOVABLE HARD DRIVE

BACKGROUND OF THE INVENTION

1. Field of the Invention

The invention lies in the computer technology field and, more specifically, in the personal computer technology. The present invention relates to a removable non-volatile memory device, that is, to a removable hard drive assembly and to various attendant methods of initializing such a hard drive, and to operating a removable hard drive.

2. Description of the Related Art

There exists an increasing need for the easy transportation of large amounts of computer programs and data. Frequently, data needs to be moved from one computer to another in a business situation or between an employee's business computer and home computer. At times data needs to be duplicated to prevent data loss. Data may need to be copied and stored in a separate physical location to allow disaster recovery. Because of the amount of data to be transported, a device is needed to allow quick data storage and recovery while being physically small for convenient transportation. Numerous devices exist that allow computer programs and data to be stored and physically removed from a computer system. All of them suffer from different limitations.

The far and away most successful of the prior art removable devices is the so-called floppy disk. It consists of a plastic disk that is covered with a magnetic material and is enclosed in a protective case. The disk is inserted into a drive within the computer which consists of magnetic heads, motors, servo positioners, and necessary electronics. The amount of data that can be stored on a 3½ inch disk is limited to 1.44 megabytes. The amount of data per disk cannot be significantly increased beyond 1.44 megabytes. While 1.44 MB was considered a large amount of data during the 1980s and the early 1990s, it is nowadays considered a very small amount. Furthermore, the data transfer rate is very slow. The drive contains mechanical components which are only partly isolated from dust. The magnetic heads used to record and recover data are susceptible to collecting dirt which renders the disks unreliable. For this reason and other mechanical considerations, the disks produced are frequently incompatible between systems.

In an attempt to increase the amount of data stored in removable media, several developments led to higher data density versions of the floppy disk. For example, a disk sold by SyQuest could store 1.5 gigabytes. However, the mechanical reliability of that medium was poor. The currently available versions have a capacity of between 100 and 750 megabytes. This amount of data is much larger than that of a floppy disk. However, it is still generally inadequate for most storage requirements. The amount of data that can be stored with that technology cannot be significantly increased. The devices are subject to the same limitations as the floppy disk drives. In addition, in order to remove the disk from the drive, the computer must be powered on and the computer's software must be working properly. There is a mechanical provision for removing disks when the computer system is not powered on; however, it is not reliable.

Computer programs and data can be stored on magnetic tape; however, this is not widely used because of low data transfer rates and poor reliability. In addition, the amount of data storage is limited and it is very difficult to access any particular part of the data since the tape must be physically positioned at that data location.

CD-ROM drives have a capacity of about 700 megabytes and DVD-ROM drives have a capacity of up to 9.4 gigabytes. While the capacity of DVD-ROM drives is adequate for many applications, the storage of data ("burning") is somewhat slow and requires significant human intervention to set up the recording process. This is particularly difficult for large transfers because data must be distributed over a number of disks. Additionally, since the drives have exposed mechanical components and the medium is subject to dust and dirt, the reliability of the stored data can be compromised. It is impossible to remove the disk from the drive unless the computer is powered on and working properly.

With the continued reduction in the pricing of electronic memory devices, such as PROMs, EEPROMs and the like, many different such storage devices have recently been introduced. These electronically programmable devices are the only ones that do not use mechanical systems to record and recover data from the memory device. The capacity of such flash memory, also known as "Pen Drives," for example, is currently limited to 1 Gigabyte. The media cost is still very high. Additionally, there are mechanical incompatibilities with a number of computer systems. To store a large amount of data, data files must be distributed over a number of devices, a time-consuming and error-prone process.

SUMMARY OF THE INVENTION

It is accordingly an object of the invention to provide a removable hard disk drive assembly, which overcomes the above-mentioned disadvantages of the heretofore-known devices and methods of this general type and which renders high volume, high speed hard drives portable and swappable.

With the foregoing and other objects in view there is provided, in accordance with the invention, a computer hard drive assembly, comprising:

a removable cartridge having a hard drive device and a first connector with data and power terminals connected to the hard drive device;

a drive assembly for fixedly mounting to a computer case, the drive assembly having an opening formed therein for receiving the removable cartridge and a second connector with data and power terminals for mating with the first connector; and a programmable processing device electronically connected to said hard drive device, the programmable processing device being configured to process information items for transmission between the hard drive device and the computer, and having means for indicating to the computer that the hard drive device is a removable device.

The term "drive" or "drive assembly" may be understood as being synonymous with the term fixed assembly or built-in drive. The term "cartridge" may be understood as being synonymous with removable drive assembly, caddy, or media.

In accordance with an added feature of the invention, the removable cartridge includes a plastic casing enclosing the hard drive device, with the first connector projecting out of the plastic casing. The plastic casing and the opening formed in the drive assembly have mutually corresponding dimensions to allow the removable device to be inserted into the opening and to snugly fit in the drive assembly.

In accordance with an additional feature of the invention, the drive assembly includes a power connector for connection to a standard power connector inside the computer case and for supplying power to the removable cartridge when the removable cartridge is inserted in the drive assembly.

In accordance with another feature of the invention, the drive assembly includes a signal connector for connection to a standardized data signal connector inside the computer case and for enabling data communication between the hard drive device and a drive controller of the computer when the removable cartridge is inserted in the drive assembly. The standardized data signal connector may be, by way of example, a connector to connect to an IDE controller, a serial ATA controller, or any other ATA standard controller.

In accordance with a further feature of the invention, the drive assembly is dimensioned for installation in a 3½ inch or a 5¼ inch drive bay of a personal computer device.

In accordance with a further feature of the invention, one or more LEDs (light emitting diodes) mounted to a face plate of the computer case in a vicinity of the drive assembly or on the drive assembly and connected to provide visual signals concerning a functionality of the hard drive assembly.

With the above and other objects in view there is also provided, in accordance with the invention, a computer device, comprising:

a computer system formed with at least one standard drive bay and including a power supply and a drive controller conforming to ATA standard (e.g., IDE, serial ATA, etc.);

a drive assembly fixedly mounted in the drive bay and connected to the power supply and to the drive controller, the drive assembly having an opening formed therein;

at least one removable cartridge having a hard drive device and being dimensioned for insertion into the opening formed in the drive assembly; and a printed circuit board electronically connected between the hard drive device and the drive controller of the system host, the printed circuit board being programmed to indicate to the system host that the hard drive device is a removable drive.

In accordance with again an added feature of the invention, the printed circuit board is mounted adjacent the opening in the drive assembly.

In accordance with again an additional feature of the invention, the removable cartridge has a first connector with data and power terminals connected to the hard drive device, the drive assembly has a second connector with data and power terminals for mating with the first connector when the removable assembly is inserted into the opening in the drive assembly.

With the above and other objects in view there is also provided, in accordance with the invention, a method of initializing a removable hard drive assembly, which comprises:

providing a drive assembly mounted to a computer and fixedly connected to a power supply and to a drive controller of the computer, and a removable cartridge having a hard drive device selectively insertable in and connectable to the drive assembly, wherein the hard drive device is identified to the computer by an ID buffer;

on power-up:

querying whether or not the hard drive device is connected in the drive assembly;

if the hard drive device is not found, returning a default ID buffer in response to the query;

if the hard drive device is found, reading an ID buffer from the hard drive device, modifying the ID buffer read from the hard drive device to mark the hard drive device as a removable drive, and returning the modified ID buffer in response to the query.

There is also provided, in accordance with the invention, a method of operating a hard drive assembly, which comprises:

providing a drive assembly mounted to a host computer and fixedly connected to a power supply and to a drive controller of the host computer, and a removable cartridge having a hard drive device selectively insertable in and connectable to the drive assembly, the hard drive device having stored thereon an ID buffer with a data item identifying the hard drive as a non-removable, fixed drive device;

modifying the ID buffer stored on the hard drive device to form a modified ID buffer identifying the hard drive device as a removable drive device; and presenting the modified ID buffer to the host computer. The host computer, therefore, considers the hard drive a removable drive and deals with it as such.

Preferably, the method comprises, upon receiving a request from the host computer for an ID buffer, testing whether or not the removable hard drive assembly has been changed from an assembly last inserted in the drive assembly, and if the removable hard drive assembly has not been changed, presenting a modified ID buffer saved in the drive assembly;

if the removable hard drive assembly has been changed, reading the ID buffer from the hard drive device, modifying the ID buffer read from the hard drive device to mark the hard drive device as a removable drive, and returning the modified ID buffer to the host computer.

In accordance with a concomitant feature of the invention, the method further comprises:

cyclically testing whether or not the host computer has issued a drive command for writing to or reading from the hard drive device; and upon receiving a drive command from the host computer, querying whether or not the removable drive device is connected in the drive assembly, and:

if the hard drive device is not found, setting a status flag indicating that no drive device is present in the drive assembly and returning an error signal;

if the hard drive device is found, executing the drive command with the hard drive device and returning signal indicating that the command has been successfully completed.

In other words, the system according to the invention is comprised of an industry standard 2½ inch hard drive mounted to a carrier board. The carrier board may be enclosed in a sealed casing, such as a molded plastic housing, to protect the hard drive. This carrier board is inserted into a main circuit board. The main circuit board is mounted in an industry standard 3½ inch or 5¼ inch drive space in the host computer. The main circuit board connects to the computer system via an industry standard IDE (integrated drive electronics) or Serial ATA hard drive interface (ATA=advanced technology attachment—an IDE interface for IBM-compatible computers).

Each hard drive contains an identification area that the computer system reads to determine the characteristics of the drive. One of the characteristics stored in this area is an indication of whether the drive is removable or permanently attached to the computer system. Hard drives are normally configured to the permanently attached state. This identification is modified by the electronics in the proposed system to indicate that the drive is removable. This will allow the operating system of the computer system to properly handle these hard drives.

The novel system according to the invention offers a number of advantages over all other removable storage systems, particularly when the amount of data to be stored is high. All mechanical components are sealed inside the hard drive, eliminating problems from dust, dirt, fingerprints, and other contaminants. This greatly increases reliability. The data capacity is greater than any other removable solution—currently up to 80 gigabytes. It is expected that data capacity will increase as newer drives are developed. Additionally, the computer system "sees" this device as another hard drive. This allows programs and data to be transferred to and from it using commonly used commands.

The connection of the proposed system to the computer system is via the conventional IDE or serial ATA (SATA) interface. That means that the computer system is unaware that the removable drive is anything but another hard drive. Thus operation of the proposed system is transparent to the operating system software used by the processor.

No special device drivers or other software is required. Because of the special circuitry and because of modifications to the identification area of the drives. The drive carrier board may be removed or inserted while the system is operating, that is, it can be hot-swapped. Current operating systems recognize the removal or insertion and act accordingly.

In the prior art systems, hard drives are known by the system as non-removable. That is, if one were to remove the hard disk drive, for example drive "D:" and replace it while the computer is running, the computer will not be able to see the data until the system is rebooted.

The computer tests each device on power-up to see if it is removable. There is information contained in each hard drive that normally specifies the disk as non-removable. The hardware in the system according to the invention "fools" the system to show the CPU that the disk is a removable disk. Thus, the removable hard disk drive behaves to the computer exactly like a floppy disk or a Zip disk. It can be removed and replaced and the computer will immediately be able to access the data.

Other features which are considered as characteristic for the invention are set forth in the appended claims.

Although the invention is illustrated and described herein as embodied in a removable hard disk drive assembly, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
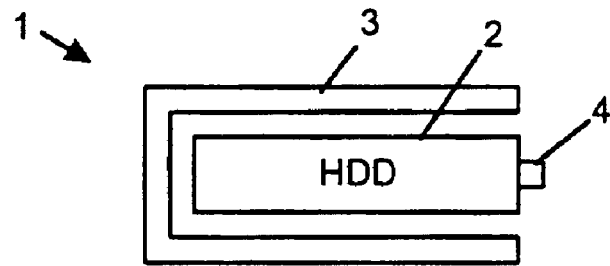
FIG. 1 is a diagrammatic side view of the removable assembly according to the invention.

Referring now to the figures of the drawing in detail and first, particularly, to FIG. 1 thereof, there is seen a removable hard drive assembly 1. The removable hard drive assembly 1 includes a conventional hard drive 2 with a standard housing. The hard drive 2 is encased in a plastic casing 3. The casing 3 may be formed onto the hard drive 2 in any suitable process, such as by heat shrinking, injection molding, form molding, or the like. The plastic casing 3 seals the hard drive 2 completely and hermetically towards the outside against dust and the like. A connector 4 is rearwardly exposed, i.e., it projects out from the plastic-encased removable hard drive assembly. The connector 4 includes two sections, namely, a section for power and a section for data. Typically, the power connection includes four terminals and the data connection, in the case of an IDE drive, includes 40 terminals.

Figure 2:
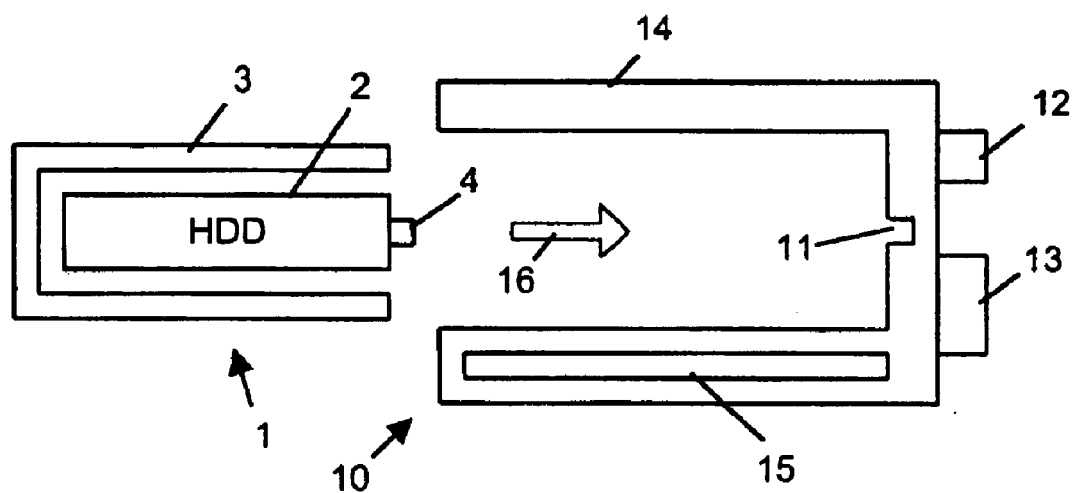
FIG. 2 is a diagrammatic side view of the fixed cradle assembly and the removable hard drive assembly, with the hard drive assembly poised for insertion into the cradle.

With reference to FIG. 2, the removable hard drive assembly 1 is dimensioned for insertion into a drive assembly 10 that is mounted in a drive bay of a computer case. The drive assembly 10 is dimensioned for mounting in either a 3½ inch or a 5¼ inch drive bay. The drive assembly 10 includes a connector 11 that receives the connector 4 of the removable hard drive assembly 1. The connector 11 connects to a power connector 12 and to a signal connector 13 on the back of a cradle 14 forming the drive assembly 10. The power connector 12 and the signal connector 13 are advantageously formed to mate with standard connectors inside the computer casing. The drive assembly 10 further includes a circuit board 15 which is connected between some terminals of the connector 11 and the signal connector 13, as will be described in the following. The insertion direction, along which the removable cartridge 1 is inserted into the drive assembly 10, is indicated with the arrow 16. Various guides, such as slide guides, funnel guides, ramps, and the like, may be provided to assure the proper insertion of the removable assembly 1 and the proper mating of the connector 4 with the connector 11. In order to assure the proper orientation of the two assemblies relative to one another, the insertion opening and the removable assembly 1 are keyed to one another.

Figure 3A:
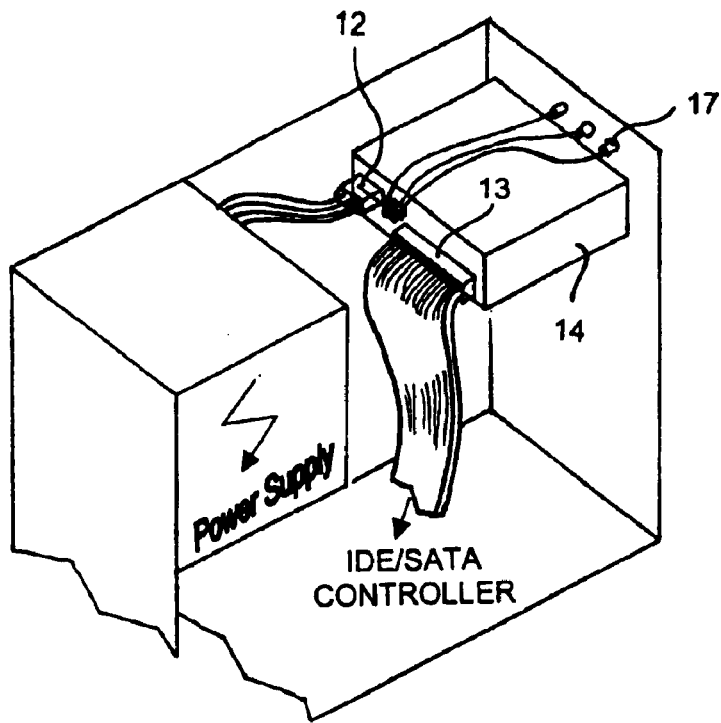
FIG. 3A is a perspective view of the inside of a computer case illustrating only the drive assembly according to the invention and its connection inside the computer case.
Figure 3B:
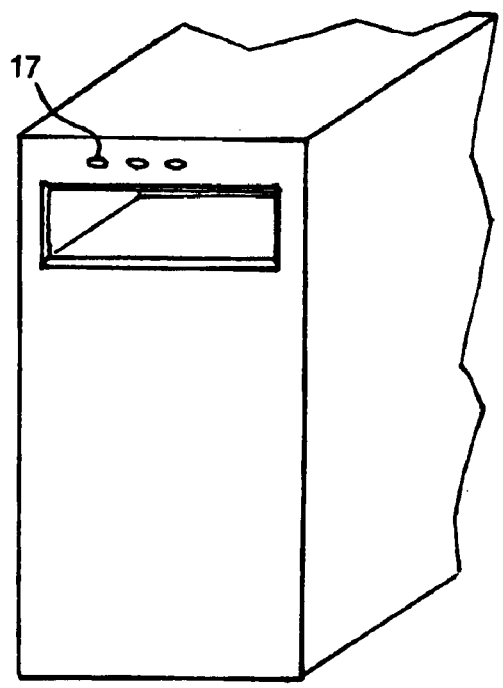
FIG. 3B is a front top perspective view of the forward portion of a tower computer case with the assembly according to the invention mounted in a drive bay in the face plate of the case, and with the removable cartridge removed.

In FIGS. 3A and 3B, the drive assembly 10 is mounted in a 5¼ inch drive bay of a mini tower of a personal computer. The connector 13 is attached to an IDE or Serial ATA cable which, on the non-illustrated opposite plug connector, is attached to the IDE or Serial ATA controller. The connector 12 is attached to a conventional 4-prong power plug which, on the opposite side is fixedly connected to a standard power supply. Functional and operational details may be observed by the user of the computer via one or more LEDs 17 (LED, light-emitting diode) that are mounted to the face panel of the host system. A variety of options are available in this context. Firstly, the LEDs 17 may be mounted to the face panel and connected via cables to the back of the drive assembly 10. Alternatively, they may be integrated in the casing 3 (on the front face) of the removable assembly 1. As a further alternative, the LEDs 17 may also be mounted to the front edge of the drive assembly 10, immediately adjacent the insertion opening.

Each hard drive has an identify buffer which contains 512 bytes of information about the hard drive such as the manufacturer, the size, the physical configuration of the drive, and others. Much of this information is fixed and cannot be changed.

Normally the host computer reads the identify buffer as it powers up, and at some other times, to determine the characteristics of the medium. The identify buffer contains three 16-bit words that are pertinent to the invention. Word 0 is used to notify the host computer of the type of device that is attached. Words 82 and 83 notify the host computer of the types of commands that the hard drive will accept. The functions of these words are as follows (from Information Technology—AT Attachment with Packet Interface—7 (ATA/ATAPI-7 V1) T13 1532D):

Word 0—General Configuration Bit-Significant Information

| BIT(S) | DESCRIPTION |
| --- | --- |
| 15 | 0 = ATA device |
| 14–8 | Retired |
| 7 | 1 = removable media device |
| 6 | Obsolete |
| 5–3 | Retired |
| 2 | Response incomplete |
| 1 | Retired |
| 0 | Reserved |

Word 82—Command Set Supported

| BIT | DESCRIPTION |
| --- | --- |
| 15 | Obsolete |
| 14 | 1 = NOP command supported |
| 13 | 1 = READ BUFFER command supported |
| 12 | 1 = WRITE BUFFER command supported |
| 11 | Obsolete |
| 10 | 1 = Host Protected Area feature set supported |
| 9 | 1 = DEVICE RESET command supported |
| 8 | 1 = SERVICE interrupt supported |
| 7 | 1 = release interrupt supported |
| 6 | 1 = look-ahead supported |
| 5 | 1 = write cache supported |
| 4 | 1 = PACKET Command feature set supported |
| 3 | 1 = mandatory Power Management feature set supported |
| 2 | 1 = Removable Media feature set supported |
| 1 | 1 = Security Mode feature set supported |
| 0 | 1 = SMART feature set supported |

Word 83=Command Sets Supported

| BIT | DESCRIPTION |
| --- | --- |
| 15 | Shall be cleared to zero |
| 14 | Shall be set to one |
| 13 | 1 = FLUSH CACHE EXT command supported |
| 12 | 1 = mandatory FLUSH CACHE command supported |
| 11 | 1 = Device Configuration Overlay feature set supported |
| 10 | 1 = 48-bit Address feature set supported |
| 9 | 1 = Automatic Acoustic Management feature set supported |
| 8 | 1 = SET MAX security extension supported |
| 7 | See Address Offset Reserved Area Boot, INCITS TR27:2001 |
| 6 | 1 = SET FEATURES subcommand required to spinup after power-up |
| 5 | 1 = Power-Up In Standby feature set supported |
| 4 | 1 = Removable Media Status Notification feature set supported |
| 3 | 1 = Advanced Power Management feature set supported |
| 2 | 1 = CFA feature set supported |
| 1 | 1 = READ/WRITE DMA QUEUED supported |
| 0 | 1 = DOWNLOAD MICROCODE command supported |

Bit 7 of Word 0, Bit 2 of Word 82, and Bit 4 of Word 83 of the Identify Buffer are all cleared, indicating to the host computer that the hard drive is not removable. These bits are fixed and they cannot be modified.

According to the invention, the circuit board 15 that is fixed in the cradle 14 provides the necessary change. When a removable cartridge 1 is plugged into the cradle 14, the circuitry on that board recognizes the insertion of the drive, reads the identify buffer of the hard drive, modifies it to indicate that the drive is removable (by setting Bit 7 of Word 0, Bit 2 of Word 82, and Bit 4 of Word 83), and stores it in an internal memory.

When the host computer asks to read the identify buffer of the drive, the processor on the circuit board 15 reads its memory and presents the modified identify buffer it has stored. Thus the host computer "sees" the hard drive 2 as a removable device and treats it as such.

Figure 4:
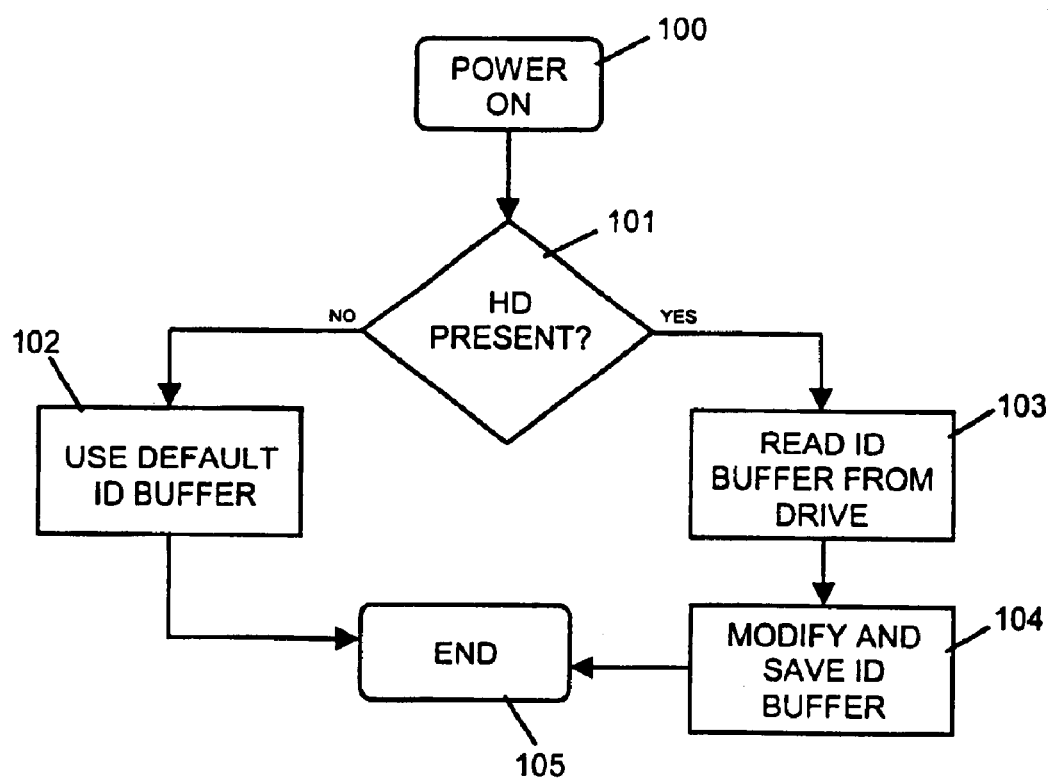
FIG. 4 is a flowchart illustrating a power-up procedure according to the invention.

The power-up process is illustrated by way of a simple flowchart in FIG. 4. On power-on at a step 100, the system BIOS queries at a step 101 whether or not a hard drive is present. If the hard drive is not connected, the system uses a default ID buffer at a step 102. If, on the other hand, the query at step 101 returns an affirmative response, then the ID buffer is read from the drive at 103. Then the ID buffer is modified and saved at a step 104, and the power-up procedure reaches its end at 105.

Figure 5:
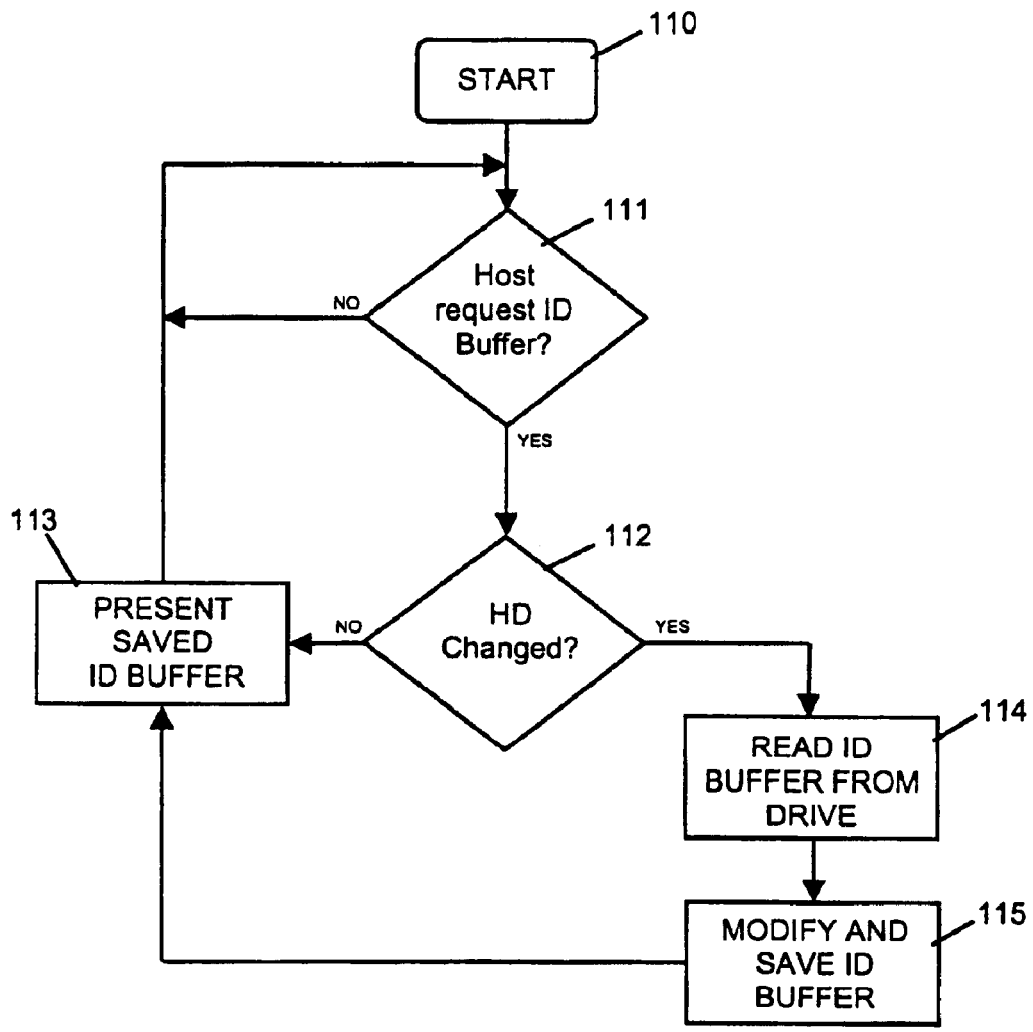
FIG. 5 is a flowchart illustrating a procedure following an identification buffer request.

The subroutine surrounding an ID buffer request is illustrated by way of a flowchart in FIG. 5. After initialization—indicated with a start box 110—the program loops around a query at 111 which detects whether or not the host system has requested an ID buffer. As long as the system does not request the ID buffer, the loop is repeated. When the query at 111 returns an affirmative response, the procedure first ascertains at a step 112 whether or not the hard drive has been changed from the last-inserted disk. If the response is negative, the previously saved ID buffer is presented to the system at a step 113. If, on the other hand, the query at step 112 returns an affirmative response, then the subroutine leads into a branch similar to the branch 103 and 104 in FIG. 4. That is, the ID buffer is read from the drive at 114 and the ID buffer is modified and saved at 115. Finally, the subroutine returns to the loop around the query 111.

Figure 6:
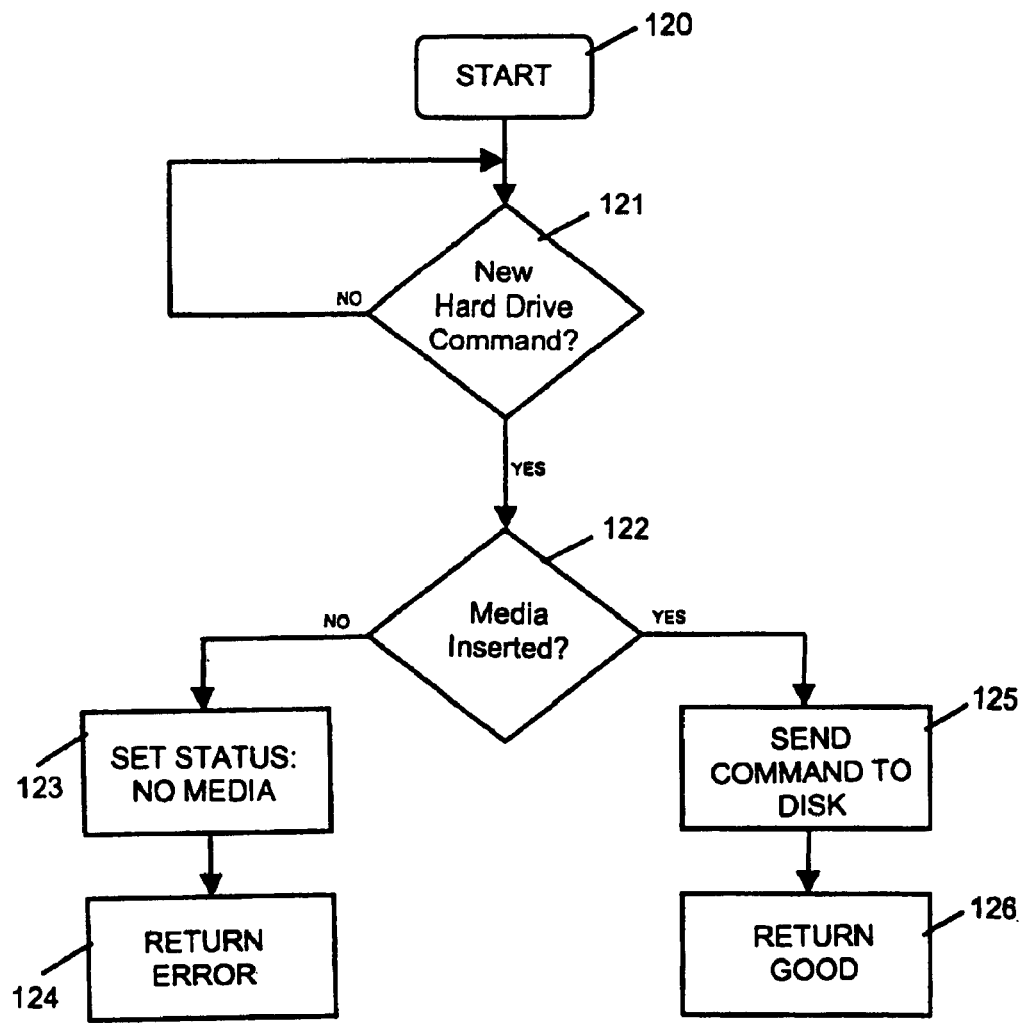
FIG. 6 is a flowchart illustrating the functional operation of the device according to the invention.

Commands for the hard drive 2 are handled according to the flowchart of FIG. 6. First, the program loops around a query 121 which detects whether or not the host system has sent a hard drive command, such as a save or a read request. As long as the system does not send an access command, the loop is repeated. When the query at 121 returns an affirmative response, the subroutine first queries at 122 whether or not a hard drive is inserted. If no disk is found, a status flag is set to no media at 123 and an error is returned at 124. If, on the other hand, the query at step 122 returns an affirmative response, the corresponding command is forwarded to the disk at 125 and an appropriate confirmation is returned at 126.

What is claimed is:

1. A computer hard drive assembly, comprising:
   a removable cartridge having a hard drive device and a first connector with data and power terminals connected to said hard drive device;
   a drive assembly for fixedly mounting to a computer case, said drive assembly having an opening formed therein for receiving said removable cartridge and a second connector with data and power terminals for mating with said first connector; and
   a programmable processing device electronically connected to said hard drive device, said programmable processing device being configured to process information items for transmission between said hard drive device and the computer, and having means for reading an identification from the hard drive, modifying the identification; and indicating to the computer that the hard drive device is a removable device.

2. The hard drive assembly according to claim 1, wherein said removable cartridge includes a plastic casing substantially completely encasing said hard drive device, with said first connector projecting out of said plastic casing.

3. The hard drive assembly according to claim 2, wherein said plastic casing and said opening formed in said drive assembly have mutually corresponding dimensions to allow said removable device to be inserted into said opening and to snugly fit in said drive assembly.

4. The hard drive assembly according to claim 1, wherein said drive assembly includes a power connector for connection to a standard power connector inside the computer case and for supplying power to said removable cartridge when said removable cartridge is inserted in said drive assembly.

5. The hard drive assembly according to claim 1, wherein said drive assembly includes a signal connector for connection to a standardized data signal connector inside the computer case and for enabling data communication between said hard drive device and a drive controller of the computer when said removable cartridge is inserted in said drive assembly.

6. The hard drive assembly according to claim 5, wherein said standardized data signal connector is a connector selected from the group consisting of IDE connectors, EIDE connectors, ATA connectors, and serial ATA connectors.

7. The hard drive assembly according to claim 1, wherein said drive assembly is dimensioned for installation in a 3½ inch or a 5¼ inch drive bay of a personal computer device.

8. The hard drive assembly according to claim 1, which further comprises at least one LED mounted to a face plate of the computer case in a vicinity of said drive assembly and connected to provide visual signals concerning a functionality of the hard drive assembly.

9. A computer device, comprising:
   a computer system formed with at least one standard drive bay and including a power supply and a drive controller conforming to the ATA standard;
   a drive assembly fixedly mounted in said drive bay and connected to said power supply and to said drive controller, said drive assembly having an opening formed therein;
   at least one removable cartridge having a hard drive device and being dimensioned for insertion into said opening formed in said drive assembly; and
   a printed circuit board electronically connected between said hard drive device and said drive controller of the system host, said printed circuit board being programmed to modify an identification of the hard drive device and to said system host that said hard drive device is a removable drive.

10. The computer according to claim 9, wherein said printed circuit board is mounted adjacent said opening in said drive assembly.

11. The computer according to claim 9, wherein said removable cartridge has a first connector with data and power terminals connected to said hard drive device, said drive assembly has a second connector with data and power terminals for mating with said first connector when said removable assembly is inserted into said opening in said drive assembly.

12. A method of initializing a removable hard drive assembly, which comprises:
   providing a drive assembly mounted to a computer and fixedly connected to a power supply and to a drive controller of the computer, and a removable cartridge having a hard drive device selectively insertable in and connectable to the drive assembly, wherein the hard drive device is identified to the computer by an ID buffer;
   on power-up:
   querying whether or not the hard drive device is connected in the drive assembly;
   if the hard drive device is not found, returning a default ID buffer in response to the query indicating that the drive device was not found, but that the drive device is a removable device;
   if the hard drive device is found, reading an ID buffer from the hard drive device, modifying the ID buffer read from the hard drive device to mark the hard drive device as a removable drive, and returning the modified ID buffer in response to the query.

13. A method of operating a hard drive assembly, which comprises:
   providing a drive assembly mounted to a host computer and fixedly connected to a power supply and to a drive controller of the host computer, and a removable cartridge having a hard drive device selectively insertable in and connectable to the drive assembly, the hard drive device having stored thereon an ID buffer with a data item identifying the hard drive as a non-removable, fixed drive device;
   modifying the ID buffer stored on the hard drive device to form a modified ID buffer identifying the hard drive device as a removable drive device; and
   presenting the modified ID buffer to the host computer.

14. The method according to claim 13, which further comprises:
   upon receiving a request from the host computer for an ID buffer, testing whether or not the removable hard drive assembly has been changed from an assembly last inserted in the drive assembly, and
   if the removable hard drive assembly has not been changed, presenting a modified ID buffer saved in the drive assembly;
   if the removable hard drive assembly has been changed, reading the ID buffer from the hard drive device, modifying the ID buffer read from the hard drive device to mark the hard drive device as a removable drive, and returning the modified ID buffer to the host computer.

15. The method according to claim 13, which further comprises:

cyclically testing whether or not the host computer has issued a drive command for writing to or reading from the hard drive device; and upon receiving a drive command from the host computer, querying whether or not the removable drive device is connected in the drive assembly, and:

if the hard drive device is not found, setting a status flag indicating that no drive device is present in the drive assembly and returning an error signal;

if the hard drive device is found, executing the drive command with the hard drive device and returning a "command completed successfully" signal.

* * * * *